United States Patent [19]

Ikeda et al.

[11] Patent Number: 5,229,039
[45] Date of Patent: Jul. 20, 1993

[54] COLOR LIQUID CRYSTAL DISPLAY AND METHOD OF MANUFACTURE

[75] Inventors: Ayumi Ikeda, Tokyo; Toshihiko Koseki, Yokohama; Toshihiro Ueki, Machida, all of Japan

[73] Assignee: International Business Machines Corporation, Armonk, N.Y.

[21] Appl. No.: 869,096

[22] Filed: Apr. 14, 1992

Related U.S. Application Data

[63] Continuation of Ser. No. 436,267, Nov. 13, 1989, abandoned.

[30] Foreign Application Priority Data

Nov. 11, 1988 [JP]  Japan .................. 63-283761

[51] Int. Cl.$^5$ .................. F21V 9/00; G02F 1/13; G02B 5/23; C08G 63/00
[52] U.S. Cl. .................. 252/582; 359/66; 359/68; 359/75; 252/586; 252/589; 528/188; 528/22; 425/1
[58] Field of Search .................. 252/582, 583, 589; 359/66, 68, 75; 528/188, 352, 226; 428/1

[56] References Cited

U.S. PATENT DOCUMENTS

| | | | |
|---|---|---|---|
| Re. 33,342 | 9/1990 | Kohtoh et al. | 528/351 |
| 4,381,886 | 5/1983 | Yokokura | 350/341 |
| 4,590,103 | 5/1986 | Ahne et al. | 427/387 |
| 4,802,743 | 2/1989 | Takao et al. | 350/339 F |
| 4,818,075 | 4/1989 | Takao et al. | 350/339 F |
| 4,837,098 | 6/1989 | Shimamura et al. | 430/7 |
| 4,877,697 | 10/1989 | Vollman et al. | 430/20 |

FOREIGN PATENT DOCUMENTS

| | | | |
|---|---|---|---|
| 0903271 | 8/1962 | European Pat. Off. | 528/188 |
| 0059790 | 9/1982 | European Pat. Off. | |
| 0209114 | 1/1987 | European Pat. Off. | 528/188 |
| 0276405 | 8/1988 | European Pat. Off. | 528/188 |
| 1901028 | 8/1970 | Fed. Rep. of Germany | 528/188 |
| 59-29225 | 2/1984 | Japan . | |
| 60-48020 | 3/1985 | Japan . | |
| 3022831 | 1/1988 | Japan | 528/188 |
| 2127438 | 5/1990 | Japan | 528/188 |

*Primary Examiner*—Robert L. Stoll
*Assistant Examiner*—C. Harris
*Attorney, Agent, or Firm*—David Aker

[57] ABSTRACT

The present invention relates in general to color liquid crystal displays and more particularly to color liquid crystal displays in which the color filter functions as the orientation layer. A film which functions as both an orientation layer controlling the orientation of liquid crystal molecules and as a color filter is described. A process for producing the combination film is also described. The process comprises synthesizing a polyimide precursor by the ring-opening polyaddition reaction of a diamine component and an acid anhydride component in a solvent. Wherein the diamine component has a predetermined structure. Further, the acid anhydride component has a predetermined structure. Finally, the process includes the step of dispersing coloring materials in the polyimide precursor to form the filter.

2 Claims, 1 Drawing Sheet

COLOR LIQUID CRYSTAL DISPLAY AND METHOD OF MANUFACTURE

This application is a continuation of application Ser. No. 07/436,267, filed Nov. 13, 1989, now abandoned.

The present invention relates in general to color liquid crystal displays and more particularly to color liquid crystal displays in which a color filter functions as an orientation layer.

BACKGROUND OF INVENTION

This invention relates to a color liquid crystal display having a film which functions as both an orientation layer and as a color filter. In such displays, the orientation layer controls the orientation of the liquid crystal molecules. The invention further relates to a method of manufacturing such films.

Japanese Published Unexamined Patent Application No. 59-29225 (Japanese Patent Application No. 57-138450) discloses the formation of a color filter by printing predetermined patterns of each color with ink compositions synthesized by mixing a resin known as polyimide with coloring materials such as azo or anthraquinone dyes. The ink is printed on each surface of a pair of glass substrates on which transparent electrodes are farmed. This application further discloses the use of the color filter as an organic orientation film. The formation of a color filter by printing polyimide on each surface of a pair of glass substrates is also disclosed. The printed polyimide forms a resin film, which is patterned using photographic technology. The resin film with the predetermined patterns is immersed in a solvent in which a colorant is dissolved to disperse the colorant in the resin film. Finally, the color filter is used as an organic orientation film.

Japanese Published Unexamined Patent Application (PUPA) No. 60-48020 (Japanese Patent Application No. 58-154803) discloses a color liquid crystal display having a color filter formed by mixing dyes in a polyimide based polymer on transparent electrodes formed on a glass substrate. The color filter is provided with a liquid crystal orientation by rubbing.

Although the methods described above are intended to produce a polyimide film which functions as both an orientation layer, controlling the orientation of liquid crystal molecules, and a color filter, it has been found that not all polyimides can be used as both a liquid crystal orientation layer and a color filter layer. For example, a diacid anhydride formed by bonding two molecules of trimellitic acid, or amide diamine synthesized from a dicarboxylic acid and a diamine cannot be used practically, even if dyes are mixed with these compounds, because of their poor liquid crystal orientation properties and poor spectroscopic light transmissivity.

SUMMARY OF THE INVENTION

A film which functions as both an orientation layer, controlling the orientation of liquid crystal molecules, and as a color filter, wherein the film comprises recurring units selected from the group consisting of:

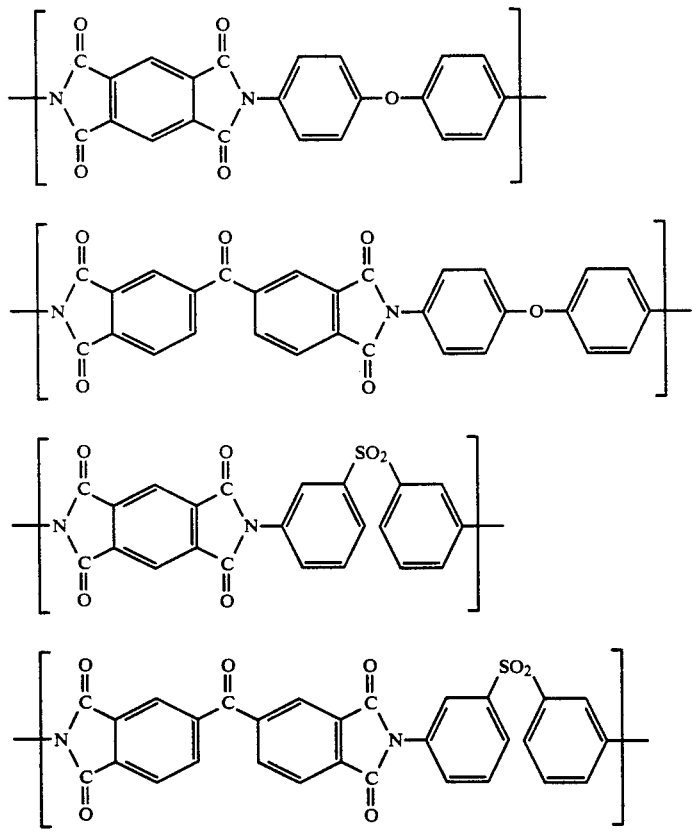

A process for producing a film which functions both as an orientation layer, controlling the orientation of liquid crystal molecules, and as a color filter. The process comprising: synthesizing a polyimide precursor by the ring-opening polyaddition reaction of a diamine component and an acid anhydride component in a solvent. The diamine component has the following structure:

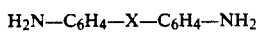

and element X comprises SO₂ or O. Further, the acid anhydride component has the following structure:

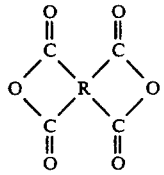

wherein element R is a phenyl or benzophenone group. Finally, the process includes the step of dispersing coloring materials in the polyimide precursor.

It is an object of this invention to provide a liquid crystal color display having a layer with functions both as a color filter of good spectroscopic light transmissivity, i.e., a high color purity and as a uniform liquid crystal orientation layer, and a method of manufacture thereof.

BRIEF DESCRIPTION OF THE DRAWING

The novel features of the invention are set forth with particularity in the appended claims. The invention itself, however, both as to organization and method of operation, together with further objects and advantages thereof, may best be understood by reference to the following description taken in conjunction with the accompanying drawing in which:

DESCRIPTION OF THE PREFERRED EMBODIMENTS

Figure 1:
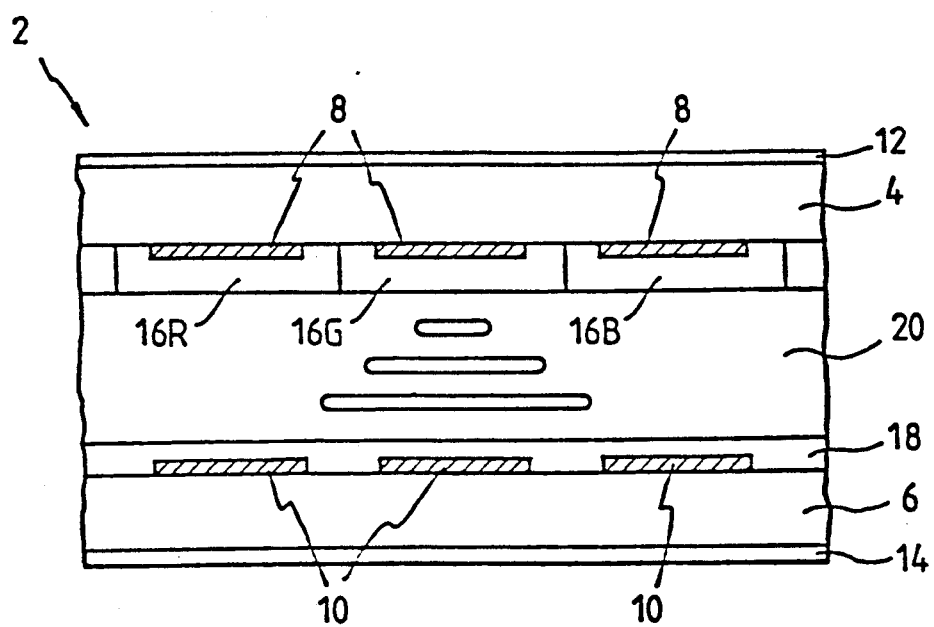
FIG. 1 shows a cross-sectional view of an embodiment of a color liquid crystal display according to the present invention.

A film having both the function of an orientation layer which controls the orientation of liquid crystal molecules and the function of a color filter, according to this invention, comprises a polyimide having recurring units represented by one of the following four general formulas:

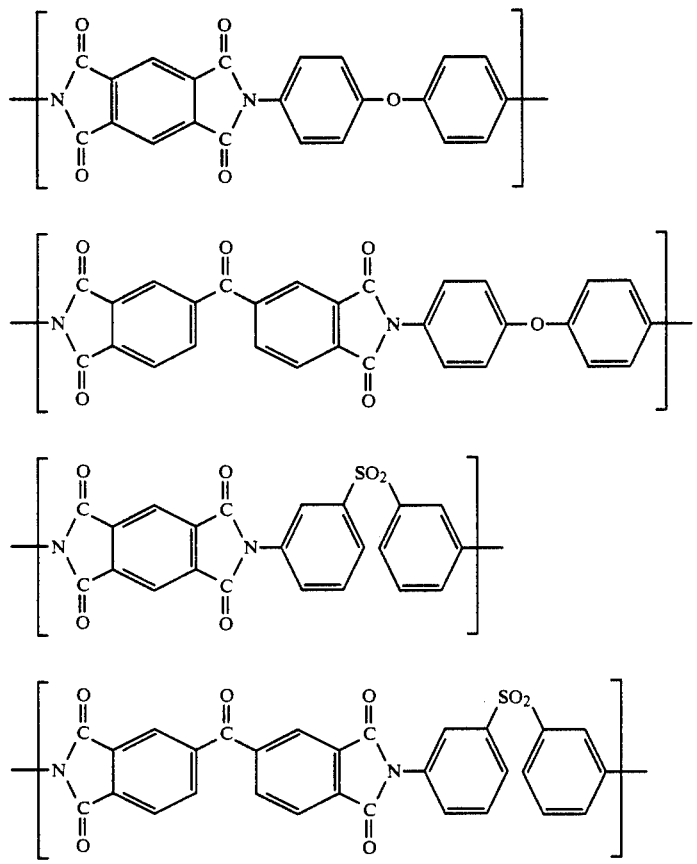

The polyimide of this invention can be obtained by the condensation polymerization reaction of a diamine component having the following structure:

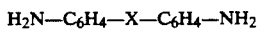

(where X is —SO₂— or —O—) and an acid anhydride component having the following structure:

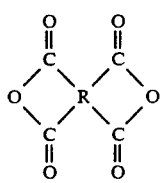

(where R is a phenyl or benzophenone radical).

In order to produce a film which functions as both a color filter and a liquid crystal orientation layer, an organic film having the recurring units listed above is manufactured by synthesizing a polyimide precursor by the ring-opening polyaddition reaction of the above components in a solvent. This is followed by the steps of dispersing dyes in the polyimide precursor, applying the dispersion to the surface of a glass substrate for liquid crystal display elements, and drying and heat-treating the glass substrate.

FIG. 1 shows an embodiment of a color liquid crystal display according to the present invention. The color liquid crystal display 2 has a pair of transparent glass substrates 4 and 6 separated by a predetermined distance. On the picture element location inside the glass substrate 4 are provided transparent display electrodes 8 consisting, for example, of Indium Tin Oxide (ITO). On the picture element location inside the glass substrate 4 are also provided transparent display electrodes 10 consisting, for example, of ITO. On the display electrode 8 provided on the red picture element location, a red filter/orientation film 16R according to the present invention is formed which has both the function of an orientation layer controlling the orientation of liquid crystal molecules and the function of a red color filter. On the display electrode 8 provided on the green picture element location, a green filter/orientation film 16G according to the present invention is formed which has both the function of an orientation layer controlling the orientation of liquid crystal molecules and the function of a green color filter. On the display electrode 8 provided on the blue picture element location, a blue filter/orientation film 16B according to the present invention is formed which has both the function of an orientation layer controlling the orientation of liquid crystal molecules and the function of a blue color filter.

On the display electrode 10 is provided an orientation film 18 which controls the orientation of liquid crystal molecules. The rubbing direction (orientation) of filter-/orientation films 16R, 16G and 16B may differ from that of the orientation film 18 by, for example, 90 degrees. Between filter/orientation films 16R, 16G and 16B, and the orientation film 18 is a liquid crystal layer 20 which is torsion-oriented by 90 degrees.

A polarizing plate 12 is provided outside the glass substrate 4, and a polarizing plate 14 is provided outside the glass substrate 6. The polarizing direction of the polarizing plate 12 may, for example, match that of the polarizing plate 14. The polarizing direction of the polarizing plate 12 is normally the same as the rubbing direction of filter/orientation films 16R, 16G and 16B. The polarizing direction of the polarizing plate 14 may differ from the rubbing direction of the orientation film 18 by, for example, 90 degrees. Thus, when the display is constructed as described above, the color liquid crystal display 2 operates in a normally black mode.

Polyimides are synthesized from a diamine and an acid anhydride. The structure of a polyimide is determined by the combination of these materials. As the result of examinations on spectrophotographic properties and liquid crystal orientation using various polyimides synthesized from different diamines and acid anhydrides in which coloring materials are dispersed, the polyamides synthesized from the following diamine components and acid anhydride components have been found to be suitable for use as the filter/orientation films 16R, 16G and 16B.

Diamine Component 1) 3,3'-diaminodiphenyl sulfone

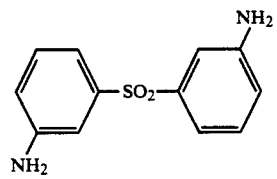

2) 4,4'-diaminodiphenyl ether

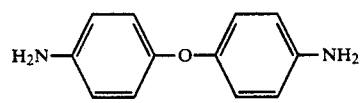

Acid Anhydride Component

1) Benzophenone tetracarboxylic dianhydride

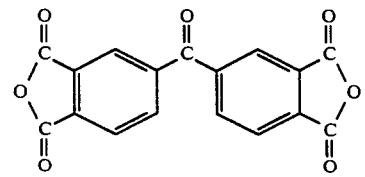

2) Pyromellitic dianhydride

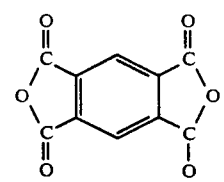

A polyimide synthesized from the above diamine components and acid anhydride components has recurring units represented by one of the following general formulas:

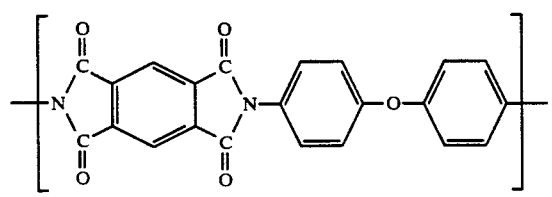

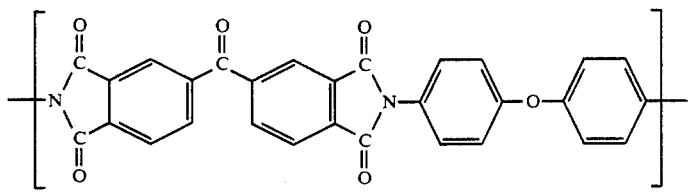

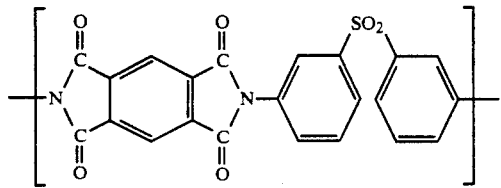

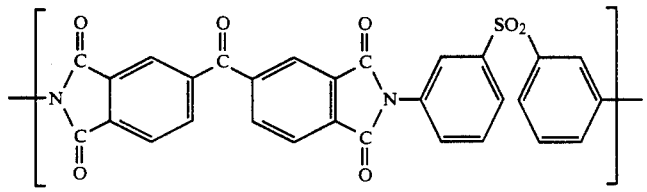

To the above four types of polyimides, the following coloring materials were added to prepare samples:
Red: Solvent Red 122
Green: Solvent yellow 21–Solvent Blue 25 (5:4)
Blue: Acid Blue 129
(The designations "Solvent Red 122", "Solvent Yellow 21", "Solvent Blue 25" and "Acid Blue 129" are well know to those of skill in the art and may be found listed in, for example, the "Color Index" published by the Society of Dyers and Colourists (UK) third edition, 1982 which is hereby incorporated by reference.)

The dispersion properties of the above coloring materials in different polyimides differed from each other, and the best combinations of these were:
Red: Combination of 4,4'-diaminodiphenyl ether and pyromellitic dianhydride
Green: Combination of 3,3'-diaminodiphenyl sulfone and benzophenone tetracarboxylic dianhydride
Blue: Combination of 3,3'-diaminodiphenyl sulfone and benzophenone tetracarboxylic dianhydride
The structural formulas are as follows:

The adequate amount of the color materials was 5 to 20% by weight for the solid resin, and a silane coupling agent for the improvement of adhesion and a solvent (polar non-proton solvent such as benzene, cyclohexanone and methyl cellosolve) for viscosity adjustment were added.

The silane coupling agent may be added to the polyimide precursor, or a film of the silane coupling agent may be intervened between filter/orientation films 16R, 16G and 16B, and the glass substrate 4.

Now, an embodiment of the process for producing a color liquid crystal display as shown in FIG. 1 will be described in relation to the fabrication of filter/orientation films 16R, 16G and 16B. First, the 4,4'-diaminodiphenyl ether, pyromellitic dianhydride (mol ratio=1:1) and N-methyl-2-pyrrolidone underwent a ring-opening polyaddition reaction in a flask to obtain a polyimide precursor. The polyimide precursor was diluted with a solvent, and 15% by weight of Solvent Red:

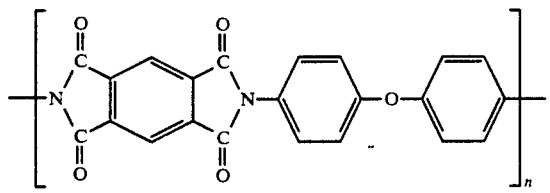

Green and Blue:

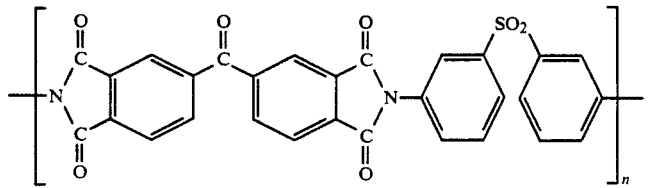

Red 122 for the solid resin was is evenly dispersed to prepare a solution for the red filter. Next, 3,3'-diaminodiphenyl sulfeon and benzophenone tetracarboxylic dianhydride (mol ratio=1:1) were allowed to react to obtain another polyimide precursor. The polyimide precursor was diluted with a solvent, and 10% by weight of a mixture of Solvent Yellow 21 and Solvent Blue 25 (5:4) was evenly dispersed to prepare a solution for the green filter. Also, 3,3'-diaminodiphenyl sulfone and benzophenone tetracarboxylic dianhydride (mol ratio=1:1) were allowed to react to obtain a polyimide precursor. The polyimide precursor was diluted with a solvent, and 8% by weight of Acid Blue 129 was evenly dispersed to prepare a solvent for the blue filter. To each of the three polyimide precursor solutions, 0.5% of an amino silane coupling agent is added and stirred to obtain a material for forming a color filter/liquid crystal orientation film.

A glass substrate 4, on which the predetermined patterns of display electrodes 8 was formed, was spin-coated with the solution for the red filter, prebaked, then spin-coated with a positive resist, and prebaked. The positive resist was exposed to ultraviolet rays through a predetermined photomask. The positive resist was then developed, etched with an aqueous solution of sodium hydroxide, rinsed, dried and removed to form a red filter/orientation film 16R. After postbaking, a green filter/orientation film 16G was formed using the solution for the green filter, and a blue filter/orientation film 16B was formed in a similar way.

The predetermined patterns of display electrodes 10 were formed on the glass substrate 6 facing the glass substrate 4, and a known polyimide orientation film (e.g., JIB manufactured by Japan Synthetic Rubber Co.) was formed. The two substrates were rubbed in the predetermined direction and heat-sealed with a sealant such as an epoxy resin, and a liquid crystal (e.g., ZLI-3449-100 manufactured by Merck & Co.) was injected between them. As a result, a color reproduction area of 70% of the National Television System Committee (NTSC) area, and having uniform orientation without reverse domain, even under a polarization microscope, were confirmed. The NTSC area may be defined as a triangle on the standard Cromaticity Diagram, wherein the apexes of the triangle have Cromaticity Coordinates at (0.67, 0.33), (0.21, 0.71) and (0.14, 0.08).

Although dyes were used in the above embodiment, any coloring materials such as pigments may be used.

The above description is for a normally-black twisted nematic liquid crystal display. However, it will easily be understood by those skilled in the art that this invention can be applied to a normally-white twisted nematic liquid crystal display in which the polarizing direction of the polarization plate 12 matches the orientation of filter/orientation films 16R, 16G and 16B. In the normally white display, the polarizing direction of the polarization plate 14 normally matches the orientation of filter/orientation films 16R, 16G and 16B and the orientation of filter/orientation films (16R, 16G and 16B may differ from the orientation of the orientation film 18 by, for example, 90 degrees.

It will also be understood by those skilled in the art that this invention is not limited to a twisted nematic liquid crystal display but may be applied to any color liquid crystal display that requires orientation.

As described above, according to the present invention, a film is provided with both the function of a color filter with a high color purity and the function of uniform liquid crystal orientation.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What I claim is:

1. A liquid crystal display comprising a pair of transparent substrates and liquid crystal material retained between said substrates so as to define a plurality of display cells, each display cell comprising at least one electrode formed on a first of said substrates, and red, green and blue color filters arranged in proximity to each other, and at least one electrode formed on the other of said substrates; said red color filter including a film comprising recurring units of the formula (1) and red coloring material dispersed in said film,

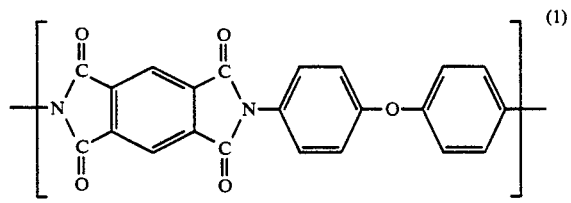

said green color filter including a film comprising recurring units of the formula (2) and green coloring material dispersed in said film,

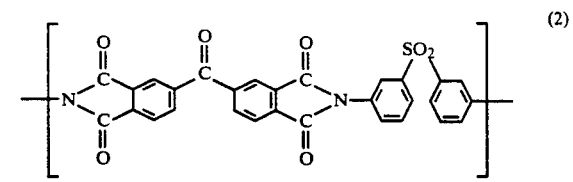

said blue color filter including a film comprising recurring units of said formula (2) and blue coloring material dispersed in said film.

2. The liquid crystal display of claim 1 wherein said films serve as orientation layers for said liquid crystal material.

* * * * *